US011511879B2

(12) United States Patent
Prosser

(10) Patent No.: US 11,511,879 B2
(45) Date of Patent: Nov. 29, 2022

(54) PERFORMANCE CAPABILITY DETERMINATION FOR AIRCRAFT

(71) Applicant: Gulfstream Aerospace Corporation, Savannah, GA (US)

(72) Inventor: Kevin Prosser, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 339 days.

(21) Appl. No.: 16/191,126

(22) Filed: Nov. 14, 2018

(65) Prior Publication Data

US 2019/0144128 A1 May 16, 2019

Related U.S. Application Data

(60) Provisional application No. 62/586,022, filed on Nov. 14, 2017.

(51) Int. Cl.
*B64D 43/02* (2006.01)
*G07C 5/02* (2006.01)
(Continued)

(52) U.S. Cl.
CPC ............ *B64D 43/02* (2013.01); *B64D 31/00* (2013.01); *G01P 5/16* (2013.01); *G01W 1/00* (2013.01);
(Continued)

(58) Field of Classification Search
CPC ......... B64D 43/02; B64D 31/00; G06F 30/20; G06F 2111/10; G07C 5/08; G07C 5/02;
(Continued)

(56) References Cited

U.S. PATENT DOCUMENTS 5,056,027 A  10/1991  Kahler
8,864,081 B2 * 10/2014 Constans ............ G05D 1/0676
244/183

(Continued)

FOREIGN PATENT DOCUMENTS

EP  2390670 A2  11/2011
EP  2390670 A3  6/2012
(Continued)

OTHER PUBLICATIONS

International Bureau of WIPO, International Search Report and Written Opinion for Application No. PCT/US2018/061075, dated Feb. 7, 2019.

(Continued)

*Primary Examiner* — Nga X Nguyen
(74) *Attorney, Agent, or Firm* — LKGlobal | Lorenz & Kopf, LLP

(57) ABSTRACT

Systems and aircraft are provided. An avionics system includes a storage device and one or more data processors. The storage device stores instructions for monitoring an actual performance of the aircraft. The one or more data processors are configured to execute the instructions to: determine a first measured value of a flight characteristic of the aircraft at a first position of the aircraft; execute at least one flight maneuver between the first position and a second position of the aircraft; generate a predicted energy change between the first position and the second position based on the at least one flight maneuver and an energy state model; determine a second measured value of the flight characteristic of the aircraft at the second position; and generate an adjustment to the energy state model based on the first measured value, the second measured value, and the predicted energy change.

17 Claims, 2 Drawing Sheets

(51) Int. Cl.
*B64D 31/00* (2006.01)
*G07C 5/08* (2006.01)
*G06F 30/20* (2020.01)
*G01W 1/00* (2006.01)
*G06N 5/04* (2006.01)
*G08G 5/00* (2006.01)
*G01P 5/16* (2006.01)
*G06F 111/10* (2020.01)

(52) U.S. Cl.
CPC .............. *G06F 30/20* (2020.01); *G06N 5/046* (2013.01); *G07C 5/02* (2013.01); *G07C 5/08* (2013.01); *G08G 5/0034* (2013.01); *G08G 5/0039* (2013.01); *G08G 5/0091* (2013.01); *G01W 2001/003* (2013.01); *G06F 2111/10* (2020.01)

(58) Field of Classification Search
CPC .. G01W 1/00; G01W 2001/003; G06N 5/046; G08G 5/0034; G08G 5/0039; G08G 5/0091; G08G 5/0052; G08G 5/0021; G01P 5/16
See application file for complete search history.

(56) References Cited

U.S. PATENT DOCUMENTS

| | | |
|---|---|---|
| 9,633,567 B1 | 4/2017 | Skoog et al. |
| 10,654,589 B2 * | 5/2020 | De Villele ............ G08G 5/0091 |
| 2006/0089760 A1 | 4/2006 | Love et al. |
| 2009/0132104 A1 | 5/2009 | Rupnik et al. |
| 2010/0286850 A1 | 11/2010 | Collot et al. |
| 2010/0314487 A1 | 12/2010 | Boelitz et al. |
| 2011/0251740 A1 | 10/2011 | Gomez Ledesma et al. |
| 2012/0158220 A1 | 6/2012 | Accardo et al. |
| 2013/0026299 A1 | 1/2013 | Constans et al. |
| 2014/0046510 A1 | 2/2014 | Randolph et al. |
| 2014/0330455 A1 | 11/2014 | McIntyre et al. |
| 2015/0364046 A1 | 12/2015 | Lissajoux et al. |
| 2016/0004255 A1 | 1/2016 | Moxon |
| 2016/0023776 A1 | 1/2016 | Ganguli et al. |
| 2016/0063867 A1* | 3/2016 | Zammit ................. G08G 5/025 701/18 |
| 2016/0178364 A1 | 6/2016 | Walter |
| 2018/0114452 A1* | 4/2018 | Dacre-Wright ...... G05D 1/0005 |
| 2018/0362190 A1* | 12/2018 | Chambers ............. B64D 45/00 |

FOREIGN PATENT DOCUMENTS

| | | |
|---|---|---|
| WO | 9956188 A1 | 11/1999 |
| WO | 2016191320 A1 | 12/2016 |

OTHER PUBLICATIONS

International Bureau of WIPO, International Search Report and Written Opinion for Application No. PCT/US2018/061081, dated Feb. 15, 2019.

International Bureau of WIPO, International Search Report and Written Opinion for Application No. PCT/US2018/061090, dated Jan. 24, 2019.

* cited by examiner

PERFORMANCE CAPABILITY DETERMINATION FOR AIRCRAFT

CROSS-REFERENCE TO RELATED APPLICATIONS

This application claims the benefit of U.S. Provisional Application No. 62/586,022 filed on Nov. 14, 2017. The disclosure of the above application is incorporated herein by reference.

TECHNICAL FIELD

The present disclosure generally relates to aircraft flight modeling with performance capability determination, and more particularly relates to determining the actual performance capability of an aircraft based on a difference between a modeled flight characteristic and a flown flight characteristic.

BACKGROUND

Determining the forces acting on an aircraft during flight utilizes complex equations that require computation of the drag acting on the aircraft. Such complex equations would require very large computational capacity onboard an aircraft to predict potential aircraft performance.

Instead of using the complex equations, energy methods have been developed to indicate the aircraft climb capability and acceleration capability of an aircraft at maximum thrust of aircraft engines. One such energy method utilizes a "specific excess power" ($P_S$). At a given altitude and airspeed, the difference between a maximum power available and a power required for maintaining the altitude and airspeed of the aircraft is known as the excess power of the aircraft. Dividing the excess power by the weight of the aircraft gives $P_S$.

$P_S$ indicates the sum of the potential climb capability (dH/dt) and the potential acceleration capability ((V/g) (dV/dt) of the aircraft. $P_S$ methods were developed and refined for air combat analysis of various fighter aircraft to identify areas of strength and weakness in threat aircraft performance. These $P_S$ methods consider only the amount of energy gained or depleted, rather than considering how or why energy is gained or depleted.

The maximum $P_S$ value at maximum throttle has been used to determine optimum climb rates, time to climb, ceilings, and other maximum characteristics. Autopilot recovery systems have utilized a maximum $P_S$ value to determine whether aircraft have enough power to clear obstacles. Although these conventional methods may be used for some aspects of aircraft trajectory modeling, they have typically been limited to use in determining maximum capabilities of an aircraft.

Furthermore, these conventional methods depend on accurate weight and condition information. For example, the actual weight of the aircraft may be different from the weight used to determine $P_S$ due to a crew programming the Flight Management System with the wrong cargo count, passenger count, or incorrect fuel amount. Similarly, ice build-up and/or wind shear conditions may cause the actual $P_S$ to vary from the expected value due to decreased performance of the aircraft.

Accordingly, it is desirable to provide methods, systems, and aircraft that provide actual aircraft performance corrected for incorrect weight and/or degraded performance in energy state models. Furthermore, other desirable features and characteristics of the present disclosure will become apparent from the subsequent detailed description and the appended claims, taken in conjunction with the accompanying drawings and the foregoing technical field and background.

SUMMARY

Systems and aircraft are provided. In a first non-limiting example, an avionics system includes a storage device and one or more data processors. The storage device stores instructions for monitoring an actual performance of the aircraft. The one or more data processors are configured to execute the instructions to: determine a first measured value of a flight characteristic of the aircraft at a first position of the aircraft; execute at least one flight maneuver between the first position and a second position of the aircraft; generate a predicted energy change between the first position and the second position based on the at least one flight maneuver and an energy state model; determine a second measured value of the flight characteristic of the aircraft at the second position; and generate an adjustment to the energy state model based on the first measured value, the second measured value, and the predicted energy change.

In a second non-limiting example, an aircraft includes a sensor system and an avionics system. The sensor system is configured for measuring a flight characteristic. The avionics system includes a storage device for storing instructions for monitoring an actual performance of the aircraft. The avionics system further includes one or more data processors configured to execute the instructions to: determine, using the sensor system, a first measured value of the flight characteristic at a first position of the aircraft; execute at least one flight maneuver between the first position and a second position of the aircraft; generate a predicted energy change between the first position and the second position based on the at least one flight maneuver and an energy state model; determine, using the sensor system, a second measured value of the flight characteristic of the aircraft at the second position; and generate an adjustment to the energy state model based on the first measured value, the second measured value, and the predicted energy change.

In a third non-limiting example, an avionics system includes: means for determining a first measured value of a flight characteristic of an aircraft at a first position of the aircraft; means for executing at least one flight maneuver between the first position and a second position of the aircraft; means for generating a predicted energy change between the first position and the second position based on the at least one flight maneuver and an energy state model; means for determining a second measured value of the flight characteristic of the aircraft at the second position; and means for generating an adjustment to the energy state model based on the first measured value, the second measured value, and the predicted energy change.

BRIEF DESCRIPTION OF THE DRAWINGS

Advantages of the present disclosure will be readily appreciated, as the same becomes better understood by reference to the following detailed description when considered in connection with the accompanying drawings wherein.

DETAILED DESCRIPTION

Figure 1:
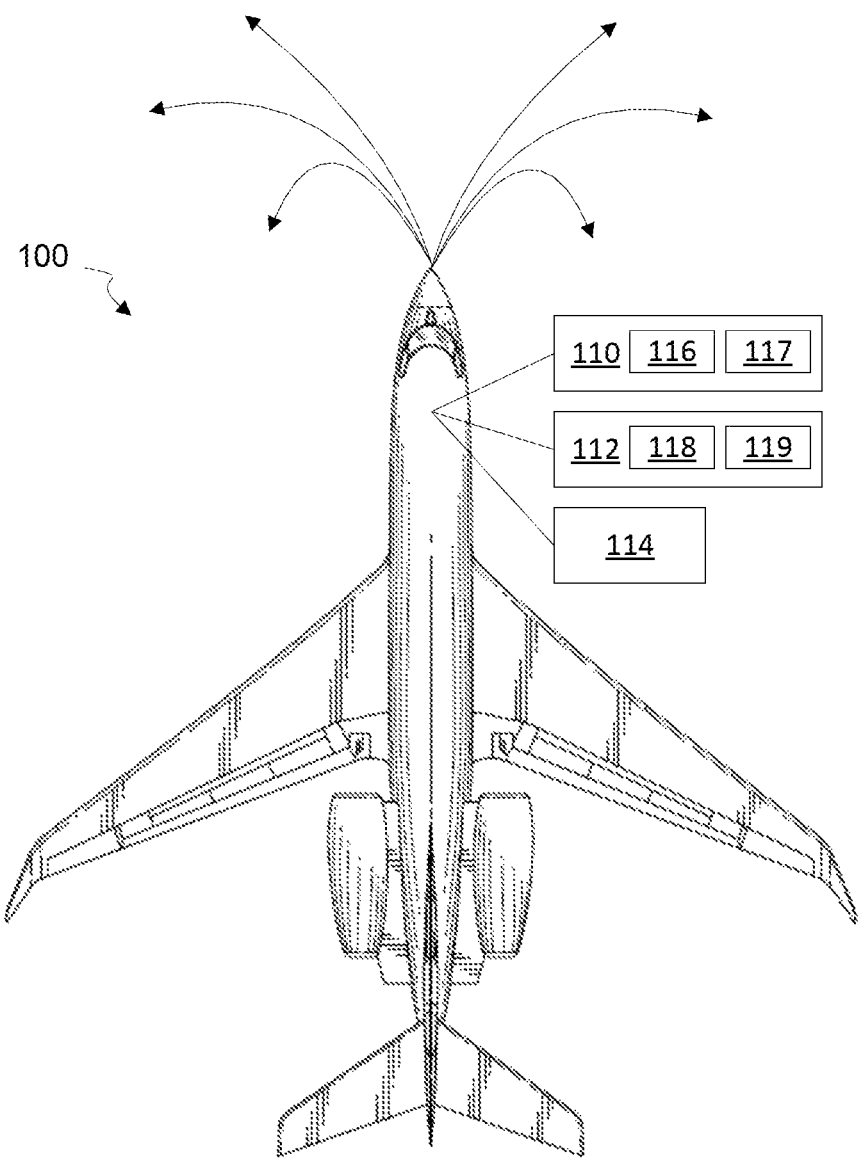
FIG. 1 is a schematic diagram illustrating an aircraft having a control system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., memory, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Various embodiments disclosed herein describe methods and systems for monitoring performance of an aircraft using measured airspeed values and an energy state model. By monitoring the performance, the systems and methods may determine whether the energy model should be adjusted. For example, an incorrectly entered loaded weight of the aircraft may be entered and/or conditions may be adversely impacting performance of the aircraft (e.g., ice buildup during flight). In some examples, the energy model utilized is the energy model described in U.S. patent application Ser. No. 15/470,776, filed Mar. 27, 2017, which is incorporated herein by reference.

Referring now to FIG. 1, an example of an aircraft 100 is illustrated in accordance with some embodiments. Aircraft 100 includes a control system 110, a sensor system 112, and an actuator system 114, among other systems. Although aircraft 100 is described in this description as an airplane, it should be appreciated that control system 110 may be utilized in other aircraft, land vehicles, water vehicles, space vehicles, or other machinery without departing from the scope of the present disclosure. For example, control system 110 may be utilized in submarines, helicopters, airships, spacecraft, or automobiles.

Control system 110 is an avionics system configured to operate aircraft 100 and to perform the methods described below. Control system 110 includes at least one processor 116 and a non-transitory computer readable storage device or medium 117. Non-transitory computer readable storage device or medium 117 is storage device for storing instructions for performing the method described below. At least one processor 116 is one or more data processors configured to execute the instructions to perform the method described below. The processor may be any custom made or commercially available processor, a central processing unit (CPU), a graphics processing unit (GPU), an auxiliary processor among several processors associated with control system 110, a semiconductor based microprocessor (in the form of a microchip or chip set), a macroprocessor, any combination thereof, or generally any device for executing instructions. The computer readable storage device or medium may include volatile and nonvolatile storage in read-only memory (ROM), random-access memory (RAM), and keep-alive memory (KAM), for example. The computer-readable storage device or medium may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by control system 110 in controlling aircraft 100.

The instructions may include one or more separate programs, each of which comprises an ordered listing of executable instructions for implementing logical functions. The instructions, when executed by the processor, receive and process signals from the sensor system, perform logic, calculations, methods and/or algorithms for automatically controlling the components of aircraft 100, and generate control signals for actuator system 114 to automatically control the components of aircraft 100 based on the logic, calculations, methods, and/or algorithms. Although only one control system 110 is shown in FIG. 1, embodiments of aircraft 100 may include any number of control systems 110 that communicate over any suitable communication medium or a combination of communication media and that cooperate to process the sensor signals, perform logic, calculations, methods, and/or algorithms, and generate control signals to automatically control features of aircraft 100. In various embodiments, one or more instructions of control system, when executed by the processor, performs the methods described below.

In the example provided, control system 110 is configured to calculate an energy state based on a current power setting of the aircraft, a current power capability of the aircraft, a speed-brake position on the aircraft, landing gear and flap settings of the aircraft, and an engine health of the aircraft. For example, control system 110 may predict the future energy state of aircraft 100 by interpolating between the maximum climb rate and the idle power descent rate at specific temperatures or other conditions and accounting for the aircraft configuration. This ability to predict energy states permits accurate transition between nose high or nose low recovery and a steady climb final segment. By utilizing a maximum climb rate and idle descent rate based at least in part on engine failure status, control system 110 provides accurate predictions whether all engines are operating or if engine failure occurs. Since the transition between nose high recovery or nose low recovery and final segment climb is determined by energy state, control system 110 can accurately model a nose high recovery even while nose low. For example, if in level flight above the single-engine service ceiling and an engine fails while near an aircraft limit, control system 110 will predict and execute a nose high recovery even though the nose is level or nose low and the aircraft is incapable of actually climbing. This is because at level flight above the single engine service ceiling, the aircraft is energy deficient and should descend even to avoid terrain. In some embodiments, the system uses a constant energy plane and a constant altitude to distinguish between nose high unusual attitudes and nose low unusual attitude. Accordingly, control system 110 may accurately avoid terrain that is above the single engine service ceiling of the aircraft while the aircraft is conducting a single engine drift down maneuver, as will be appreciated by those of ordinary skill in the art.

Sensor system 112 includes one or more sensing devices that sense observable conditions of the exterior environment, the interior environment of aircraft 100, or operational conditions and status of aircraft 100. For example, sensor system 112 may include accelerometers, gyroscopes, RADARs, LIDARs, global positioning systems, optical cameras, thermal cameras, ultrasonic sensors, and/or other sensors. In the example provided, sensor system 112 includes a pitot static system with a pitot tube 118 and a static port 119 for determining Indicated Airspeed, as will be appreciated by those with ordinary skill in the art.

Actuator system 114 includes one or more actuator devices that control one or more vehicle features. For example, actuator system 114 may include actuators that manipulate control surfaces on aircraft 100, extend or retract landing gear of aircraft 100, an/or move other components of aircraft 100.

Figure 2:
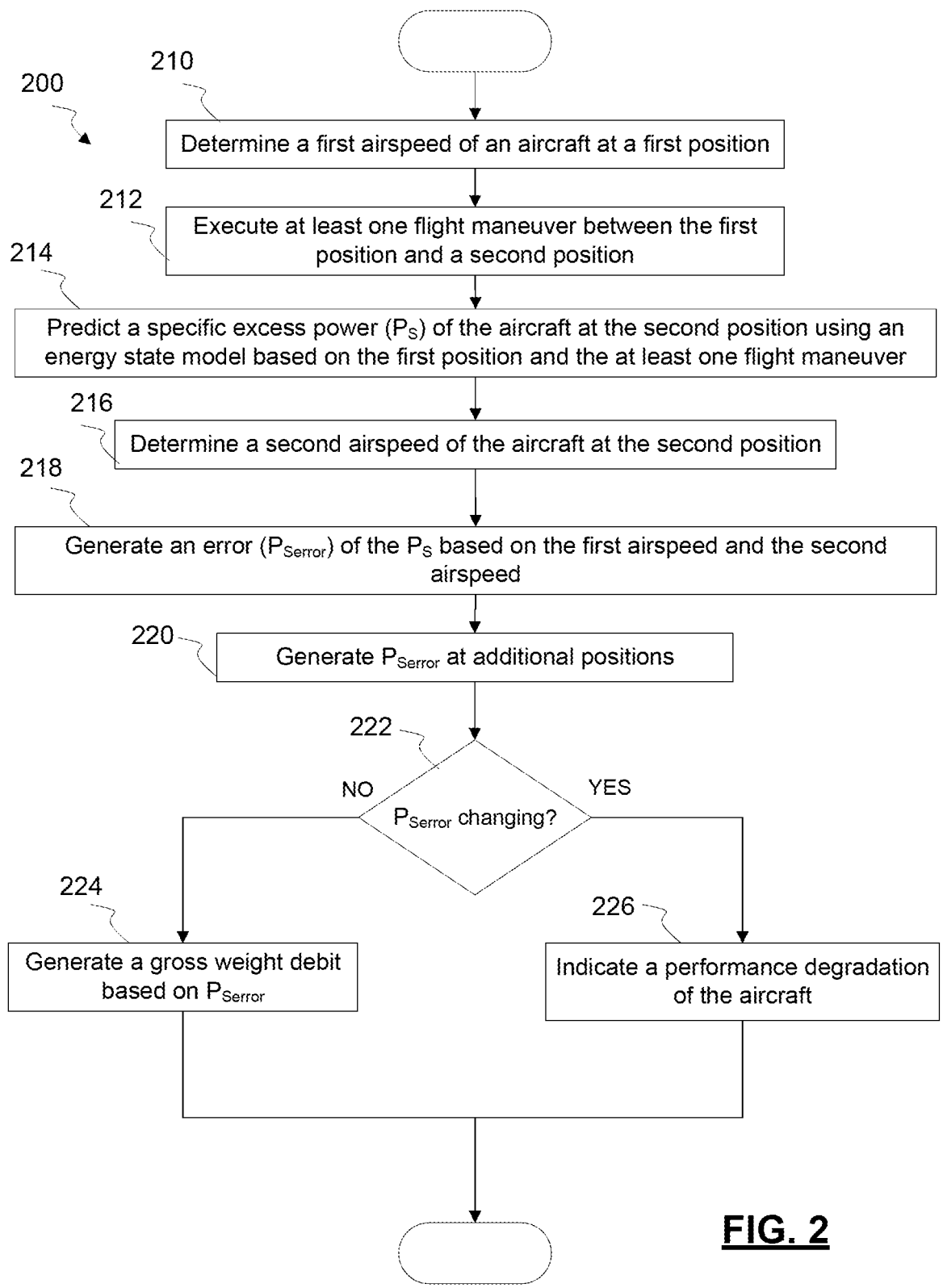
FIG. 2 is a flow chart illustrating a method for monitoring an actual aircraft performance, in accordance with various embodiments.

Referring now to FIG. 2, and with continued reference to FIG. 1, a method 200 for monitoring performance of an aircraft is illustrated in flow diagram form. In the example provided, control system 110 performs the tasks of method 200. For example, control system 110 may store instructions on storage device 117 for processor 116 to execute to perform the tasks of method 200. In some examples, method 200 generates an adjustment for an energy state model that may be utilized to correct for actual aircraft performance along a potential trajectory of the aircraft in a hazard awareness system. For example, control system 110 may determine whether a potential aircraft trajectory complies with a flight envelope based on the energy state model and the adjustment.

In the example provided, control system 110 adjusts the predicted energy state of the energy state model to account for real world variances in performance. For example, without accounting for variances, a predicted performance capability may be overly optimistic if a crew programs the Flight Management System with the wrong cargo count, passenger count, or incorrect fuel amount. An overly optimistic performance capability estimate may result in failing to clear an obstacle that the system predicted would be cleared. To account for variances, control system 110 runs the energy prediction algorithm backwards in time in some embodiments. Instead of using current energy and computing a future energy state by adding in the energy excess or energy deficit, control system 110 may use the current energy state and previous energy states to compute what the energy excess/deficit should be. The difference between actual and predicted energy excess/deficit is the error that results from gross weight errors, non-standard day errors (e.g., errors from days that are hotter or colder than a standard day, etc.), or the error in the prediction itself. In addition to use in the trajectory prediction algorithm, the real-world performance variances may be useful any time performance capability estimation is desirable. For example, the variance prediction may be used to detect ice buildup that is degrading performance, may be applied to wind shear alerting systems, or may be used in any other performance capability related application.

Task 210 determines a first measured value of a flight characteristic of the aircraft at a first position of the aircraft. In the example provided, the first measured value and a second measured value are values of True Airspeed (TAS) as the flight characteristic. Accordingly, task 210 determines a first airspeed of an aircraft at a first position. For example, control system 110 may compute the first True Airspeed ($TAS_{first}$) based on measurements from the pitot-static system of sensor system 112 while aircraft 100 is at the first position. In the example provided, position is a location with respect to Earth. In some embodiments, the position indicates aircraft orientation and/or configuration information.

Task 212 executes at least one flight maneuver between the first position and a second position. It should be appreciated that the ordinals "first" and "second" and the presentation order of tasks in the claims below do not indicate an order of operations unless specifically stated. For example, aircraft 100 may be at the second position before (i.e., earlier in time) aircraft 100 is at the first position. In the example illustrated in FIG. 2, aircraft 100 executes the at least one maneuver to fly from the first position to the second position.

Task 214 generates a predicted energy change between the first position and the second position based on the at least one flight maneuver and an energy state model. For example, control system 110 may generate the predicted energy change as a specific excess power of the aircraft based on the aircraft configuration and throttle position. In some examples, control system 110 predicts a specific excess power ($P_S$) of aircraft 100 at the second position using an energy state model based on the first position and the at least one flight maneuver.

In the example provided, the energy state model is based on data stored as a table of a curve fit of PS for each of an idle power throttle setting ($P_{Sidle}$) and of a full power throttle setting ($P_{SMax}$). $P_S$ for conditions other than idle throttle and full throttle are derived from $P_{Sidle}$ and $P_{SMax}$. Mid power, for example, is a simple average of $P_{SMax}$ and $P_{Sidle}$. Gross Weight effects may be accounted for with a $P_S$ debit that effectively describes the $P_S$ penalty that goes with carrying the extra weight, as will be discussed below. Other conditions may be treated as debits on $P_S$. For example, speedbrakes may be treated as a debit with ratio of speed brakes used to scale the debit accordingly. Single engine effects may be treated as a debit by using a percentage of the available $P_S$. For example, a single engine $P_S$ may be 40-45% (i.e., a 55-60% debit) of the two engine $P_S$, where 50% debit is due to only having one engine and the other 5-10% debit is the engine OFF debit due to the drag a non-running engine has over an idling engine.

In some examples, the following pseudocode illustrates how an actual specific energy ($P_{SActual}$) may be calculated:

```
/* Given conditions */
Ps at idle, Ps at Full Power (PsIdle, PsMax)
Percent SpeedBrakes (%SB), Percent Thrust (%Thrust) with zero being
idle, and full being 100%
%Thrust= (LeftEngine%Thrust + RightEngine%Thrust)/2;
    /* (If engine is off vice idle, %thrust is negative ~5-10%) */
/* Compute Ps */
PsActual = PsIdle + (PsMax–PsIdle)*%Thrust;
*/ Then subtract/add debits */
PsActual = PsActual – SBDebit*%SB;
PsActual = PsActual + GWDebit*(ActualGW–NominalGW);
```

Task 216 determines a second measured value of the flight characteristic of the aircraft at the second position. For example, control system 110 may determine a second airspeed value of aircraft 100 at the second position based on measurements from the pitot-static system of sensor system 112.

Task 218 generates an adjustment to the energy state model based on the first measured value, the second measured value, and the predicted energy change. For example, control system 110 may generate an error $P_{Serror}$ of the $P_S$ based on the first airspeed and the second airspeed. In the example provided, control system 110 generates the adjustment as a specific excess power error $P_{Serror}$ according to:

$$(TAS_{new} - TAS_{old})*(TAS_{avg}*60)/(dt*32.2) + VVI - P_{Spredicted} = P_{Serror}, \quad \text{(eq. 1)}$$

In eq. 1, $TAS_{new}$ is the first measured value, $TAS_{old}$ is the second measured value, $TAS_{avg}$ is an average True Airspeed between the first position and the second position, and $P_{Spredicted}$ is the predicted specific energy change. In eq. 1, dt represents the change in time between the first position and the second position, 32.2 is acceleration due to gravity, $P_S$ is energy gain potential, VVI is vertical velocity indicated. VVI indicates the amount of energy you are using to climb or descend and the airspeed indicates the energy used for accelerating. In the example provided, TAS is expressed in ft/sec, VVI is expressed in Ft/min, and $P_S$ is expressed in Ft/min.

Task 220 generates $P_{Serror}$ at additional positions. For example, aircraft 100 may repeat tasks 210, 212, 214, 216, and 218 at additional first and second positions. In the example provided, the additional values are averaged, and a debit is applied to subsequent calculations of $P_S$ using the energy state model.

Task 222 determines whether $P_{Serror}$ is changing over time. For example, control system 110 may determine whether $P_{Serror}$ at the additional positions differs from the original $P_{Serror}$ by more than a threshold amount to determine that $P_{Serror}$ is changing over time. In the example provided, control system 110 categorizes the $P_{Serror}$ as a type of error in the actual performance based on a trend in the $P_{Serror}$ over time.

When $P_{Serror}$ is changing over time, method 200 proceeds to task 226. When $P_{Serror}$ is not changing over time, method 200 proceeds to task 224.

Task 224 categorizes the $P_{Serror}$ as an incorrect weight type of error in response to a static $P_{Serror}$ during an initial climb phase of flight. Every pound of weight above or below actual produces a PS error of some value (AircraftConstant) in ft/min value based on the specific airplane and engine combination. For example, some aircraft produce an error of about 0.1 ft/min. It should be appreciated that the actual value of AircraftConstant varies by implementation. Accordingly, control system 110 may generate a gross weight debit based on $P_{Serror}$ to calculate a weight debit according to:

$$Gw_{debit} = P_{Serror}/\text{AircraftContant} \quad \text{(eq. 2)}$$

Task 226 indicates a performance degradation of the aircraft. For example, control system 110 may indicate the performance degradation as an ice buildup that is degrading performance, as wind shear, or as other types of performance degradation.

The various embodiments permit correction of incorrect actual performance capability information.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An avionics system for an aircraft, the avionics system comprising:
a storage device for storing instructions for monitoring an actual performance of the aircraft; and
one or more data processors configured to execute the instructions to:
provide an energy state model of the aircraft, the energy state model of the aircraft providing for predictions of specific excess power of the aircraft based at least in part on a configuration of the aircraft and a throttle position of the aircraft, and wherein the energy state model includes a value describing a gross weight of the aircraft used for the providing the predictions of specific excess power;
determine a first measured value of a flight characteristic of the aircraft at a first position of the aircraft;
execute at least one flight maneuver between the first position and a second position of the aircraft;
generate a predicted specific excess power of the aircraft between the first position and the second position based on the at least one flight maneuver and the energy state model;
determine a second measured value of the flight characteristic of the aircraft at the second position; and
generate an adjustment to the energy state model based on the first measured value, the second measured value, and the predicted specific excess power of the aircraft between the first position and the second position, and where the adjustment to the energy state model is implemented by changing the value describing the gross weight of the aircraft.

2. The avionics system of claim 1, wherein the one or more data processors are configured to execute the instructions to determine the first measured value and the second measured value as values of True Airspeed (TAS) as the flight characteristic.

3. The avionics system of claim 2, wherein the one or more data processors are configured to execute the instructions to generate the adjustment as a specific excess power error (PSerror) according to:

$$(TASnew-TASold)*(TASavg*60)/(dt*32.2)+VVI-PSpredicted=PSerror,$$

wherein TASnew is the first measured value, TASold is the second measured value, TASavg is an average True Airspeed between the first position and the second position, dt is a change in time between the first position and the second position, VVI is a vertical speed indicated by the aircraft, and PSpredicted is the predicted specific excess power of the aircraft between the first position and the second position.

4. The avionics system of claim 3, wherein the one or more data processors are configured to execute the instructions to categorize the PSerror as a type of error on the actual performance based on a trend in the PSerror over time.

5. The avionics system of claim 4, wherein the one or more data processors are configured to execute the instructions to categorize the PSerror as an incorrect weight type of error in response to a static PSerror during an initial climb phase of flight.

6. The avionics system of claim 5, wherein the one or more data processors are configured to execute the instructions to change the value describing the gross weight of the aircraft by calculating a weight debit according to: Gwdebit=PSerror/AircraftConstant, where AircraftConstant is specific to a model of aircraft.

7. The avionics system of claim 1, wherein the one or more data processors are configured to execute the instructions to determine whether a potential aircraft trajectory complies with a flight envelope based on the energy state model and the adjustment.

8. An aircraft comprising:
a sensor system configured for measuring a flight characteristic; and
an avionics system comprising a storage device for storing instructions for monitoring an actual performance of the aircraft and one or more data processors configured to execute the instructions to:
provide an energy state model of the aircraft, the energy state model of the aircraft providing for predictions of specific excess power of the aircraft based at least in part on a configuration of the aircraft and a throttle position of the aircraft, and wherein the energy state model includes a value describing a gross weight of the aircraft used for the providing the predictions of specific excess power;
determine, using the sensor system, a first measured value of the flight characteristic at a first position of the aircraft;
execute at least one flight maneuver between the first position and a second position of the aircraft;
generate a predicted specific excess power of the aircraft between the first position and the second position based on the at least one flight maneuver and the energy state model;
determine, using the sensor system, a second measured value of the flight characteristic of the aircraft at the second position; and
generate an adjustment to the energy state model based on the first measured value, the second measured value, and the predicted specific excess power of the aircraft between the first position and the second position, and where the adjustment to the energy state model is implemented by changing the value describing the gross weight of the aircraft.

9. The aircraft of claim 8, wherein the one or more data processors are configured to execute the instructions to determine the first measured value and the second measured value as values of True Airspeed (TAS) as the flight characteristic.

10. The aircraft of claim 9, wherein the one or more data processors are configured to execute the instructions to generate the adjustment as a specific excess power error (PSerror) according to:

$$(TASnew-TASold)*(TASavg*60)/(dt*32.2)+VVI-PSpredicted=PSerror,$$

wherein TASnew is the first measured value, TASold is the second measured value, TASavg is an average True Airspeed between the first position and the second position, dt is a change in time between the first position and the second position, VVI is a vertical speed indicated by the aircraft, and PSpredicted is the predicted specific excess power of the aircraft between the first position and the second position.

11. The aircraft of claim 10, wherein the one or more data processors are configured to execute the instructions to categorize the PSerror as a type of error on the actual performance based on a trend in the PSerror over time.

12. The aircraft of claim 11, wherein the one or more data processors are configured to execute the instructions to categorize the PSerror as an incorrect weight type of error in response to a static PSerror during an initial climb phase of flight.

13. The aircraft of claim 12, wherein the one or more data processors are configured to execute the instructions to change the value describing the gross weight of the aircraft by calculating a weight debit according to: Gwdebit=PSerror/AircraftConstant, where AircraftConstant is specific to a model of aircraft.

14. The aircraft of claim 8, wherein the one or more data processors are configured to execute the instructions to determine whether a potential aircraft trajectory complies with a flight envelope based on the energy state model and the adjustment.

15. An avionics system comprising:
- means for determining a first measured value of a flight characteristic of an aircraft at a first position of the aircraft;
- means for executing at least one flight maneuver between the first position and a second position of the aircraft;
- means for generating a predicted specific excess power of the aircraft between the first position and the second position based on the at least one flight maneuver and an energy state model, where the energy state model provides for predictions of specific excess power of the aircraft based at least in part on a configuration of the aircraft and a throttle position of the aircraft, and wherein the energy state model includes a value describing a gross weight of the aircraft used for the providing the predictions of specific excess power;
- means for determining a second measured value of the flight characteristic of the aircraft at the second position; and
- means for generating an adjustment to the energy state model based on the first measured value, the second measured value, and the predicted specific excess power of the aircraft between the first position and the second position, and where the adjustment to the energy state model is implemented by changing the value describing the gross weight of the aircraft.

16. The avionics system of claim 15, further comprising means for determining the first measured value and the second measured value as values of True Airspeed (TAS) as the flight characteristic.

17. The avionics system of claim 15, further comprising means for categorizing the adjustment as a type of error based on a trend in the predicted specific excess power over time.

* * * * *